United States Patent
Katayama

(10) Patent No.: US 7,692,828 B2
(45) Date of Patent: Apr. 6, 2010

(54) IMAGE READING APPARATUS

(75) Inventor: Takafumi Katayama, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 964 days.

(21) Appl. No.: 11/429,987

(22) Filed: May 9, 2006

(65) Prior Publication Data
US 2006/0256402 A1 Nov. 16, 2006

(30) Foreign Application Priority Data
May 10, 2005 (JP) ............................. 2005-137260

(51) Int. Cl.
*H04N 1/04* (2006.01)

(52) U.S. Cl. ...................... 358/498; 358/496; 358/474; 399/367; 399/371; 399/372

(58) Field of Classification Search ................ 358/496, 358/498, 408, 474; 399/367, 371, 372
See application file for complete search history.

(56) References Cited

U.S. PATENT DOCUMENTS

| 5,519,512 | A | * | 5/1996 | Bandai et al. ............... 358/474 |
| 5,739,925 | A | * | 4/1998 | Kameyama et al. ......... 358/498 |
| 5,764,382 | A | * | 6/1998 | Shiraishi ..................... 358/496 |
| 5,786,847 | A | | 7/1998 | Katayama et al. ............ 348/47 |
| 5,825,513 | A | * | 10/1998 | Hasegawa .................... 358/498 |
| 5,907,434 | A | | 5/1999 | Sekine et al. ............... 359/462 |
| 6,178,274 | B1 | * | 1/2001 | Youda et al. ................ 382/312 |
| 2008/0239415 | A1 | * | 10/2008 | Nakamura et al. .......... 358/498 |

FOREIGN PATENT DOCUMENTS

JP 2003-125140 4/2003

* cited by examiner

*Primary Examiner*—Cheukfan Lee
(74) *Attorney, Agent, or Firm*—Fitzpatrick, Cella, Harper & Scinto

(57) ABSTRACT

An image reading apparatus comprises a conveyance rotating body for conveying an original document, an image reading sensor for reading an image of the original document being conveyed by the conveyance rotating body, and a plate-like member for pressing the original document being conveyed by the conveyance rotating body against an image reading surface of the image reading sensor, wherein the plate-like member is curved such that the central part thereof as viewed in the direction orthogonal to the conveying direction of the original document first comes in contact with the image reading sensor.

5 Claims, 5 Drawing Sheets

A ENLARGED VIEW

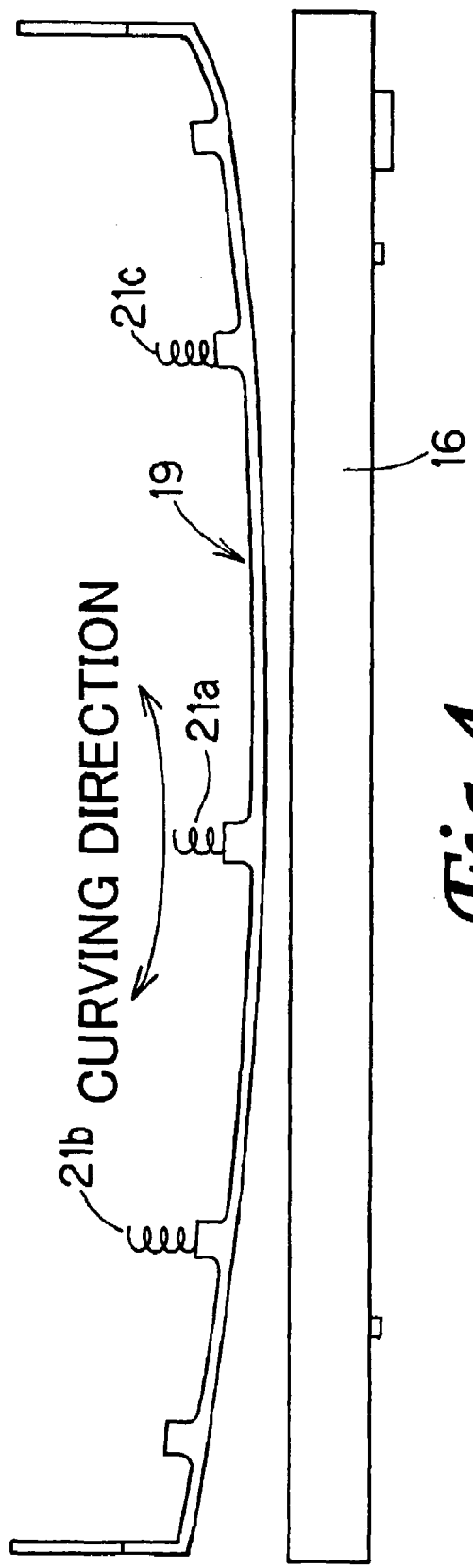

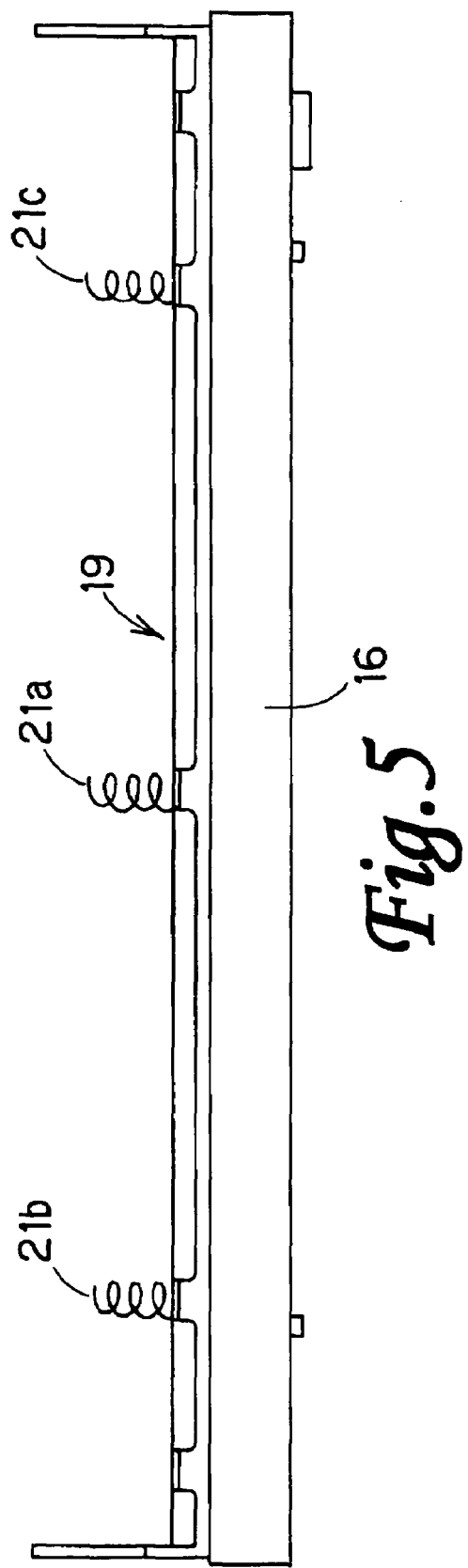

IMAGE READING APPARATUS

BACKGROUND OF THE INVENTION

1. Field of the Invention

The present invention relates to an image reading apparatus for reading an image of an original document.

2. Related Background Art

In a conventional image forming apparatus such as an copying machine and a facsimile machine or a conventional image reading apparatus such as a scanner, a white reference plate for making shading correction, which is confronted with a document reading means for reading an image of an original document, is composed of a sheet metal member and a white sheet member (Japanese patent laid-open No. 2003-125140). Further, it includes a white reference plate including a white mold member.

An image reading sensor reads an image of an original document while the original document is being conveyed in a state that the original document is pressed against the image reading sensor by the reference plate.

If pressing forces by the image reading sensor, caused by the reference plate, are different as viewed in the direction orthogonal to a conveying direction of the original document, the original document possibly skews. For example, when a pressing force imparted to one end of the original document in the direction orthogonal to the conveying direction of the original document is larger than a pressing force to the other end thereof, the document skew is easy to occur.

Particularly, when the reference plate is constructed with a thin mold member, the pressing forces acting in the direction orthogonal to the conveying direction of the original document tend to lose their balance.

SUMMARY OF THE INVENTION

To achieve above-mentioned object, the present invention provides an image reading apparatus comprising:

a conveyance rotating body for conveying an original document;

an image reading sensor for reading an image of the original document being conveyed by the conveyance rotating body; and a plate-like member which presses the original document being conveyed by the conveyance rotating body against an image reading surface of the image reading sensor, wherein the plate-like member is curved such that the central part thereof as viewed in the direction orthogonal to the document conveying direction first comes in contact with the image reading sensor.

Accordingly, the present invention is capable of reducing a skew of the original document, and reading an image of an original document with higher precision.

BRIEF DESCRIPTION OF THE DRAWINGS

FIG. 4 is a front view showing the white reference plate when it is not pressed in the embodiment of the present invention; and FIG. 5 is a front view showing the white reference plate when it is pressed in the embodiment of the present invention.

DETAILED DESCRIPTION OF THE PREFERRED EMBODIMENT

Figure 1:
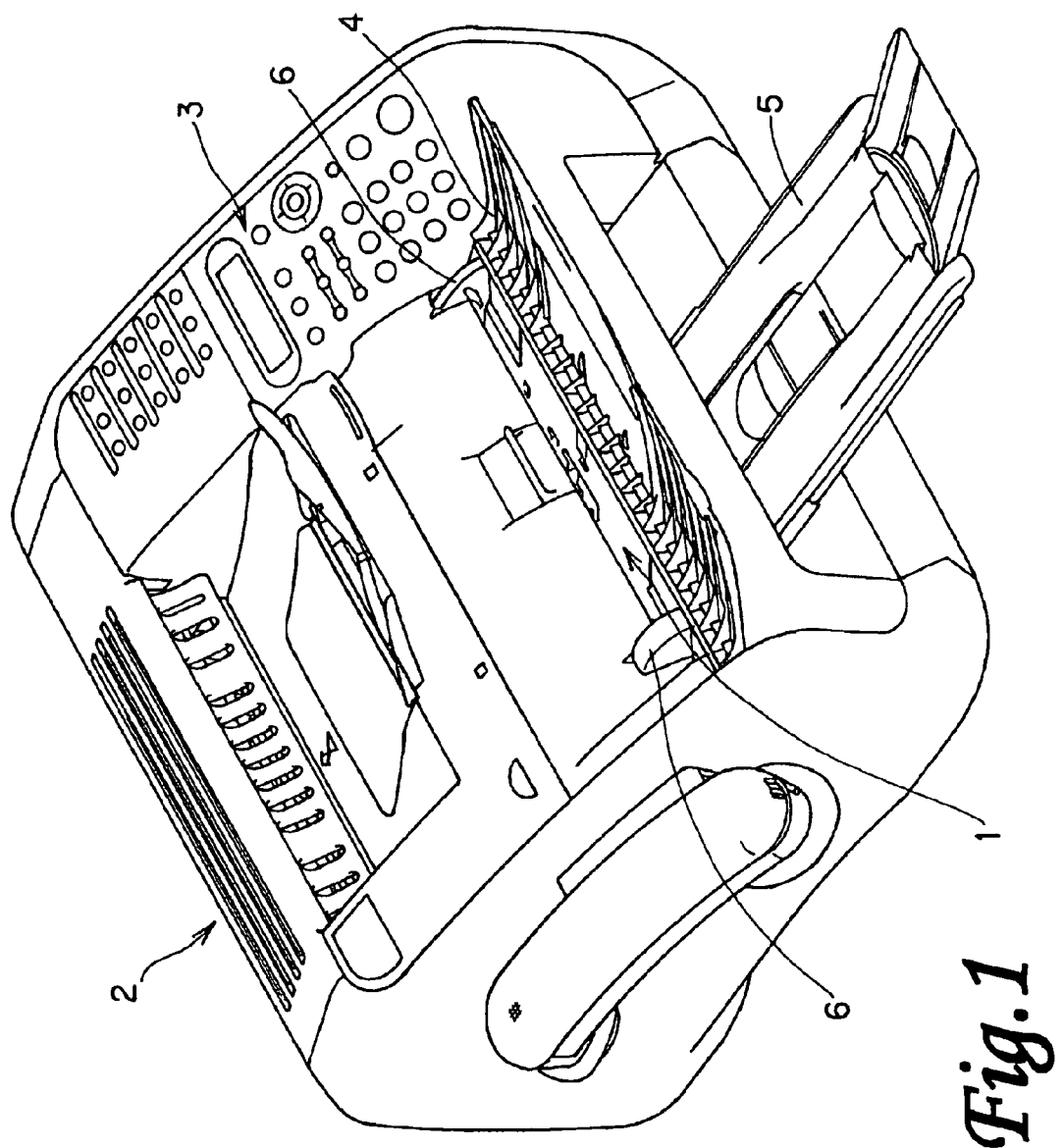
FIG. 1 is a perspective view showing an image forming apparatus which is an embodiment of the present invention.

An embodiment of the present invention will be described with reference to the accompanying drawings. Throughout the drawings of the embodiment hereinbelow, like reference numerals are used for designating like or equivalent portions.

Figure 2:
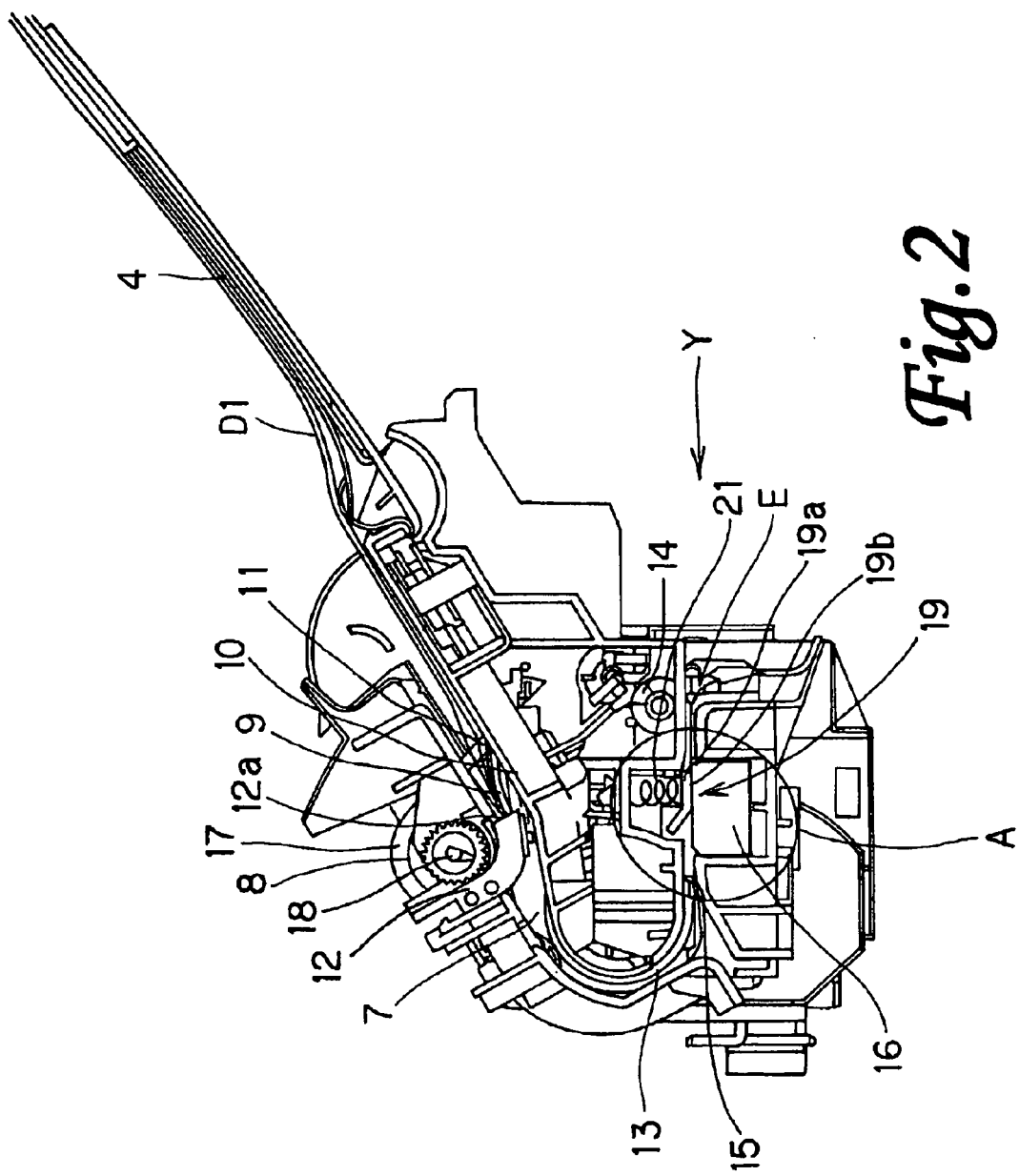
FIG. 2 is a cross sectional view showing a sheet document reading portion in the embodiment of the present invention.
Figure 3:
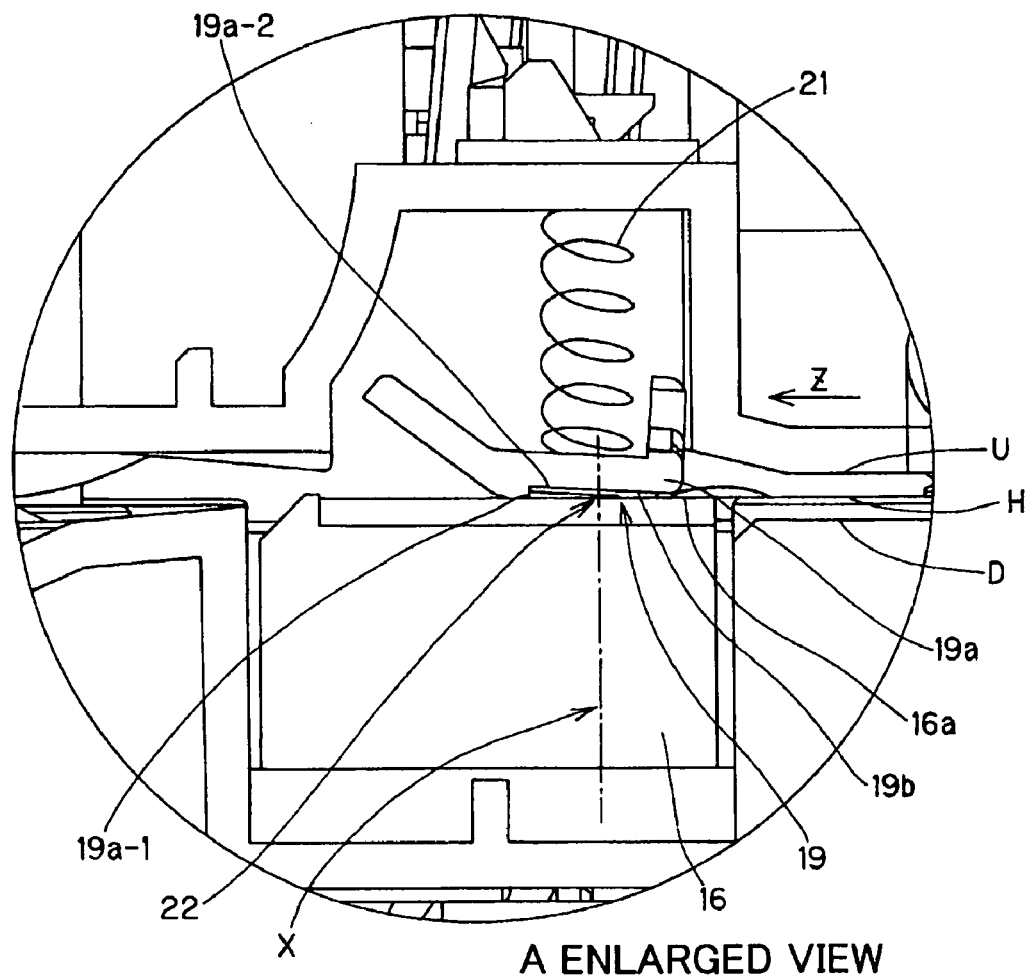
FIG. 3 is a partially enlarged view showing a white reference plate in the embodiment of the present invention.

FIG. 1 is a perspective view showing an image forming apparatus which is an embodiment of this present invention. FIG. 2 is a cross sectional view showing a sheet document reading portion 1. FIG. 3 is a partially enlarged view showing a portion enclosed by a circle A in FIG. 2.

As shown in FIG. 1, in the image forming apparatus, the sheet document reading portion 1 is provided on front side of the apparatus, and an image forming apparatus 2, on the rear side thereof. An operation panel 3 is disposed on the right side of the apparatus. The apparatus further includes a document tray 4, a document discharge tray 5, and a slider 6. The slider 6 moves in the direction of the width, which is orthogonal to a document conveying direction, to align both side edges of the original documents placed on the document tray 4.

As shown in FIG. 2, a document conveying path (hereinbelow, referred to as "U-turn path") 7, shaped like U, is provided in the sheet document reading portion 1. The U-turn path 7 is provided in association with a separation roller 8 and a separation pad 9, a preliminary conveying member 10 in contact with the separation roller 8, a document sensor 11 for detecting presence or absence of an original document D1, a stopper member 12, a conveyance roller 13 and a discharge roller pair 14 as rotating bodies for conveying the original document D1, and a document edge sensor 15 for detecting the leading and the trailing ends of the original document D1, and others.

A contact image sensor 16 as an image reading sensor irradiates an image-information contained surface of the original document D1 with light emitted from a LED array as a light source. When light reflected on the image-information contained surface is focused on the sensor elements through a lens (e.g., SELFOC (trade mark) lens) thereby to read image information.

In a document conveying portion, when the operator placed the original document D1 on a document tray 4, the operator faces the image reading side of the original document D1 upward and places it from front side of the image forming apparatus. At this time, the leading edge of the original document D1 is butted against a document leading-edge restricting part 12a of the stopper member 12 thereby to prevent the original document from being inserted into a separation portion where the separation roller 8 and the separation pad 9 are contacted with each other. Presence of the original document D1 is also detected by the document sensor 11.

When the operator operates the operation panel 3 to instruct the apparatus to start a reading operation, a drive portion (not shown) rotates and a stopper lift gear 17 mounted to a separation shaft 18, which supports the separation roller 8, rotates to move the stopper member 12 upward. And the document leading-edge restricting part 12a of the stopper member 12 leaves the leading edge of the original document. In turn, the preliminary conveying member 10 conveys the original documents D1 to the separation portion constructed with the separation roller 8 and the separation pad 9, and the original documents D1 are separated sheet by sheet and the uppermost original document D1 is separated and conveyed. The separated original document D1 is conveyed along the U-turn path 7 by the conveyance roller 13 and reaches the image reading surface of the contact image sensor 16.

In the document conveying portion, after the document edge sensor 15 detects the leading edge of the original document D1, the contact image sensor 16 starts an operation of reading image information from the original document at a position where the original document has advanced a predetermined distance from the leading edge detecting position. The original document D1, which has been conveyed to between the contact image sensor 16 and a white reference plate 19 by the conveyance roller 13, is subjected to the image reading operation in a state that the original document is pressed against the white reference plate 19 by a pressing spring 21. After the image reading operation is started, the original document passes through a document discharge path H, which is defined by a discharge upper guide U and a discharge lower guide D, and reaches the discharge roller 14.

After the trailing end of the original document D1 is detected by the document edge sensor 15, the image information reading operation that has been conducted by the contact image sensor 16, ends at a position where the original document has advanced a predetermined distance from the trailing end detecting position. The original document D1 is discharged, by the discharge roller pair 14, to outside the apparatus through a discharge port E located at the downstream end of the document discharge path H. As shown in FIG. 3, the document discharge path H which guides the original document having passed the contact image sensor 16 to the discharge port E, is substantially linear in shape.

In this way, in the image reading apparatus A, the image reading operation is repeated until the document sensor 11 detects that no original document is present.

(White Reference Plate)

The white reference plate 19 will be described below. The white reference plate 19 for guiding the original document being conveyed is confronted with a glass surface 16b which is an image reading surface of the contact image sensor 16. The white reference plate 19 presses the original document being conveyed against the glass surface 16b of the contact image sensor 16. The white reference plate 19 extends in a direction orthogonal to the document conveying direction. The white reference plate 19 is composed of a plate-like mold member 19a and a white reference sheet 19b for providing the reference white for the shading correction. The plate-like mold member 19a is made of resin. As for the white reference sheet 19b, a stepped part 19a-1 is formed on the mold member 19a, and the white reference sheet 19b is pasted on a pasting surface 19a-2. According to this structure, a slight gap 22 is formed which prevents the white reference sheet 19b from being in close contact with the CIS glass surface 16a at a position of an image reading line X.

If the white reference sheet 19b is in close contact with the glass surface 16b, the close contact part is dark, the white reference is incorrectly acquired, and the resultant image is degraded in quality. To cope with this, the slight gap 22 is formed.

A view of the white reference plate 19 when viewed in a direction Z in FIG. 3 is shown in FIG. 4. As shown in FIG. 4, the white reference plate 19 is curved such that the center of the white reference plate 19 as viewed in the document conveying direction first comes in contact with the contact image sensor 16. That is, the plate-like mold member 19a is curved such that the central part of the member which has a length that extends in the direction orthogonal to the document conveying direction, first comes in contact with the contact image sensor 16. As shown in FIG. 5, when the white reference plate 19 comes in close contact with the contact image sensor 16, both ends of the white reference plate 19 are bent toward the contact image sensor 16 by pressing springs 21a, 21b and 21c, so that the white reference plate 19 is flat on the CIS glass surface 16a of the contact image sensor 16.

In order to prevent both ends of the white reference plate 19 from raising from the contact image sensor 16, called "floating" of the white reference plate 19, two pressing springs may additionally be provided at both ends of the white reference plate 19. By adopting such a structure, the pressing forces acting on the central part of the original document are larger than those acting on both sides of the original document, thereby suppressing a skew of the original document when it is conveyed.

If the contact image sensor 16 is curved in the direction opposite to the curving direction in the above case, the pressing forces acting on both sides of the original document are larger than those acting on the central part thereof. Therefore, the skew of the original document when it is conveyed becomes large. The mold member 19a of the white reference plate 19 is disposed blocking the upstream side of the document discharge path H.

In this embodiment, the shading correction is carried out according to white reference data which is obtained from reflection light reflected from the white reference plate 19 when the white reference plate 19 is irradiated with light from the LED array, and black reference data obtained without emitting light from the LED array. When the black reference data is acquired, some measure to prevent light from entering the contact image sensor 16 must be taken.

In a case where external light enters the white reference plate 19 in the direction Y in FIG. 2 through gaps of the document discharge path H, if the light is of the type in which it passes though the mold member 19a, the reference data acquired is incorrect because of presence of the external light when the reference data is acquired for the shading correction, resulting in image deterioration.

Specifically, when the mold member is made of a material, for example, a dyestuff-based colorant, viz., a material allowing the external light to pass therethrough, the external light enters the contact image sensor, failing to obtain proper color reference data. In this embodiment, to avoid this problem, a pigment-based colorant is used in the mold member 19a. By use of such a colorant, light transmittance of the colorant is less than 5%, preferably less than 1% (measured under white light by a digital illuminometer T-1, manufactured by Minolta Corporation), whereby the image deterioration is suppressed. According to the experiment conducted by the inventor of the present invention, it was confirmed that no image deterioration occurs when the light transmittance of the mold member 19a is less than 5%.

Thus, it suffices that the light transmittance of the mold member is selected to be a member which light does not transmit substantially (including perfectly light non-transmittive regions), that is, cause no image deterioration. In the embodiment of the present invention, a mold member which light does not transmit substantially is used of the mold member having a light transmittance of less than 1%.

As described above, according to this embodiment as mentioned above, the image reading apparatus is capable of acquiring excellent image data without any influence by external light.

This application claims priority from Japanese Patent Application No. 2005-137260 filed May 10, 2005, which is hereby incorporated by reference, herein.

What is claimed is:

1. An image reading apparatus comprising:
a conveyance unit configured to convey an original document;
an image reading unit configured to read an image of the original document being conveyed by the conveyance unit; and
a plate-like member which presses the original document being conveyed by the conveyance unit against the image reading unit,
wherein the plate-like member is formed in a curved shape as viewed along its length extending orthogonally to a conveying direction of the original document such that the central part of a surface of the plate-like member, which is opposite to the image reading unit, in a direction orthogonal to the conveying direction protrudes toward the image reading unit, and
wherein the plate-like member is deformable into a straight shape from the curved shape.

2. The image reading apparatus according to claim 1, further comprising:
a plurality of pressing springs being arrayed in the direction orthogonal to the conveying direction in order to press the plate-like member against the image reading unit.

3. The image reading apparatus according to claim 1, further comprising:
a white reference sheet pasted to the surface of the plate-like member opposite to the image reading unit,
wherein the plate-like member has a contacting portion on the surface of the plate-like member, that contacts with the image reading unit, the contacting portion is flat on image reading unit in the state that the plate-like member contacts with the image reading unit,
wherein the plate-like member has a concave portion on the surface of the plate-like member so that a gap between the image reading unit and the white reference sheet is formed at a position where the image reading unit reads an image of the original document in the state that the contacting portion contacts the image reading unit, and
wherein the contacting portion contacts with the image reading unit in all areas in the direction orthogonal to the conveying direction.

4. The image reading apparatus according to claim 1, wherein the plate-like member is composed of a member through which light does not transmit substantially.

5. The image reading apparatus according to claim 1, wherein the plate-like member is composed of a mold member.

* * * * *